United States Patent
Fan

Patent Number: 6,046,997
Date of Patent: Apr. 4, 2000

[54] ASYNCHRONOUS TRANSFER MODE SWITCHING METHOD AND ASYNCHRONOUS TRANSFER MODE SWITCH

[75] Inventor: Ruixue Fan, Tokyo, Japan

[73] Assignee: NEC Corporation, Japan

[21] Appl. No.: 08/764,483

[22] Filed: Dec. 12, 1996

[30] Foreign Application Priority Data

Dec. 13, 1995 [JP] Japan ................................. 7-346881

[51] Int. Cl.[7] .............................................. H04L 12/28
[52] U.S. Cl. ............................................ 370/395; 395/413
[58] Field of Search .................................... 370/395, 413, 370/414, 419, 423, 427, 236, 412

[56] References Cited

U.S. PATENT DOCUMENTS

| | | | |
|---|---|---|---|
| 5,189,668 | 2/1993 | Takatori et al. | 370/60.1 |
| 5,280,475 | 1/1994 | Yanagi et al. | 370/60.1 |
| 5,455,820 | 10/1995 | Yamada | 370/412 |
| 5,457,700 | 10/1995 | Merchant | 370/100.1 |
| 5,838,677 | 11/1998 | Kozaki et al. | 370/389 |

OTHER PUBLICATIONS

R. Fan, et al., "Expandable ATOM Swith Architecture (XATOM) for ATM LANs", IEEE (1994), pp. 402–409.

*Primary Examiner*—Huy D. Vu
*Assistant Examiner*—Alexander Boakye
*Attorney, Agent, or Firm*—Ostrolenk, Faber, Gerb & Soffen, LLP

[57] ABSTRACT

In an ATM switch its method of operation includes accumulating a cell input from an input port in an input multiplex buffer connected to the input port to which the cell has been input; inhibiting output of a cell addressed to a certain output port from an input multiplex buffer when the cell of the certain output port, equal to or more than a threshold value, has been accumulated in the input multiplex buffer; outputting cell, except for the inhibited output cell, from the input multiplex buffer and accumulating the output cell in an output buffer corresponding to an output port of the output cell; outputting cell accumulated in the output buffer and accumulating the output cell in an output separation buffer corresponding to output port of the output cell; and outputting cells accumulated in the output separation buffer to be output to an output port to which the cell is addressed.

8 Claims, 8 Drawing Sheets

ASYNCHRONOUS TRANSFER MODE SWITCHING METHOD AND ASYNCHRONOUS TRANSFER MODE SWITCH

BACKGROUND OF THE INVENTION

This invention relates to a method for switching Asynchronous Transfer Mode (hereinafter referred to as ATM) and an ATM switch used for multi-media.

Conventionally various types of ATM switches, for example, of a shared buffer switch type, an output buffer switch type or the like, have been suggested. In order to manage the traffic exhibiting strong burst with the ATM switches of the above-described type, a high speed/large capacity buffer has to be employed.

Figure 7:
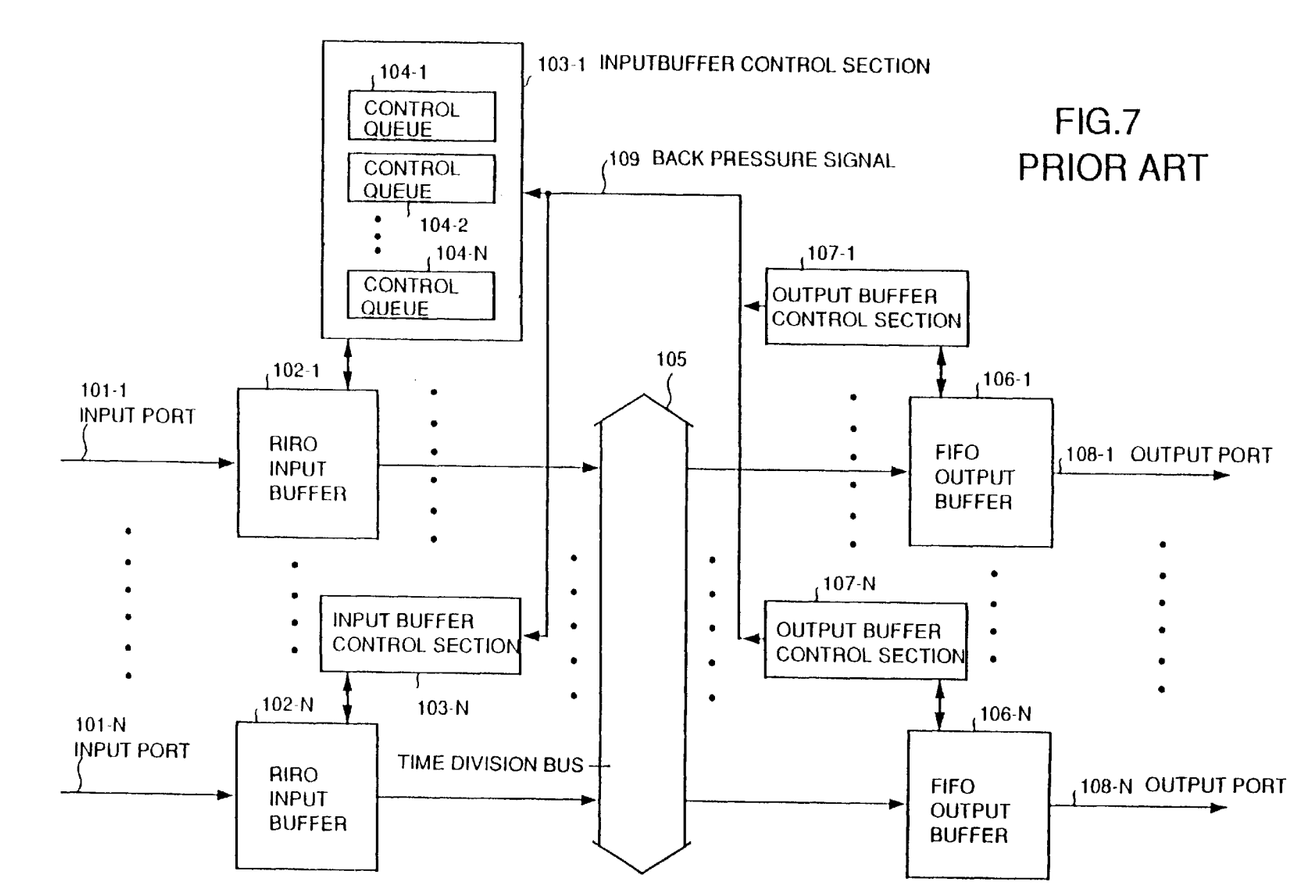
FIG. 7 is a block diagram of a prior art.

An ATM switch as shown in FIG. 7 has been proposed for managing the strong burst traffic not using such a high speed/large capacity buffer. Referring to FIG. 7, the conventional ATM switch comprises N input ports 101-1 to 101-N, low speed/large capacity RIRO (Random In Random Out) input buffers 102-1 to 102-N, each connected to the respective input ports 101-1 to 101-N, input buffer control sections 103-1 to 103-N for controlling the respective RIRO input buffers 102-1 to 102-N, N output ports 108-1 to 108-N, high speed/small capacity FIFO output buffers 106-1 to 106-N, each connected to the respective output ports 108-1 to 108-N, output buffer control sections 107-1 to 107-N for controlling the respective FIFO output buffers 106-1 to 106-N and outputting a back pressure signal 109 and a time division bus 105 for connecting the RIRO input buffers 102-1 to 102-N to the respective FIFO output buffers 106-1 to 106-N. The FIFO output buffers 106-1 to 106-N are allowed to receive N cells (N: the number of the input ports) simultaneously.

A cell input to the input port 101-1 is accumulated in a vacant space of the RIRO input buffer 102-1 through the input buffer control section 103-1. The input buffer control section 103-1 has N control queues 104-1 to 104-N for controlling cells accumulated in the RIRO input buffer 102-1 by each of the output ports 108-1 to 108-N. When the cell is accumulated in a vacant space of the RIRO input buffer 102-1, an accumulation address of the cell is stored in a control queue corresponding to an output port indicated by the output port information contained in the cell. The input buffer control section 103-1 refers to each of the control queues 104-1 to 104-N one after another to read out each cell based on the accumulation address prefixed thereto. The other input buffer control sections control in the same manner as described above.

Each cell read from the respective RIRO input buffers 102-1 to 102-N is stored in the FIFO output buffer corresponding to the output port indicated by the output port information contained in the cell via the time division bus 105.

When a vacant space of the FIFO output buffer 106-$i$ becomes less than N cells, an output buffer control section 107-$i$ for controlling write/read of the cell to/from the FIFO output buffer 106-$i$ ($1 \leq i \leq N$) outputs a back pressure signal 109 to all input buffer control sections 103-1 to 103-N so as to inhibit output of the cell addressed to the output port 108-$i$. When the back pressure signal 109 is received, the respective input buffer control sections 103-1 to 103-N sequentially output cells accumulated in the RIRO input buffers 102-1 to 102-N other than those cells addressed to the output port 108-$i$.

Utilizing a combination of the low speed/large capacity RIRO input buffers 102-1 to 102-N and high speed/small capacity FIFO output buffers 106-1 to 106-N to output a back pressure signal 109 from each of the FIFO output buffers 106-1 to 106-N allows for management of the strong burst traffic without using the high speed/large capacity buffer.

In order to realize a large scale ATM switch accommodating a large number of input ports and output ports using the aforementioned construction as shown in FIG. 7, it is necessary to utilize a large number of RIRO input buffers and FIFO output buffers. However a large number of those RIRO input buffers and FIFO output buffers may require increased interface interface with the time division bus, which is difficult to practically realize owing to the number of pins for connecting the RIRO input buffers and FIFO output buffers to the time division bus. Even though such ATM switch is realized, the resultant cost is substantially increased.

Figure 8:
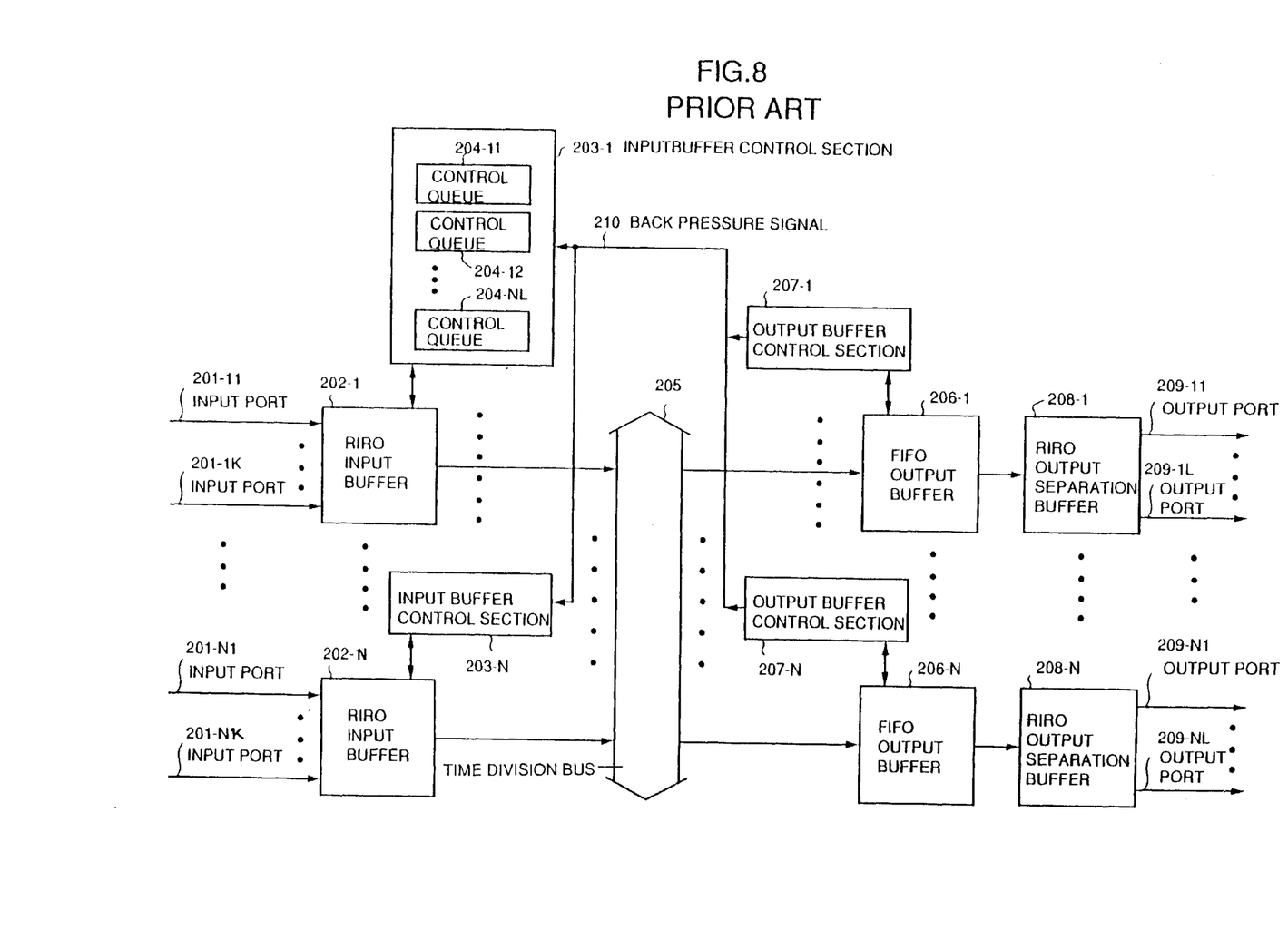
FIG. 8 is a block diagram of another prior art.

In order to decrease the number of interfaces with the time division bus, the construction shown in FIG. 8 has been proposed.

The ATM switch shown in FIG. 8 comprises NxK input ports 201-11 to 201-NK, N units of low speed/large capacity RIRO input multiplex buffers 202-1 to 202-N, input multiplex buffer control sections 203-1 to 203-N for controlling each write/read of cells to/from the RIRO input multiplex buffers 202-1 to 202-N, a time division bus 205, N units of high speed/small capacity FIFO output buffers 206-1 to 206-N, output buffer control sections 207-1 to 207-N for controlling read/write of cells from/to the FIFO output buffers 206-1 to 206-N, N units of low speed/large capacity RIRO output separation buffers 208-1 to 208-N and NxL units of output ports 209-11 to 209-NL. Each of the FIFO output buffers 206-1 to 206-N is able to receive N (the number of RIRO input multiplex buffers) cells simultaneously.

The RIRO input multiplex buffers 202-1 to 202-N have K input ports (201-11 to 201-1K) to (201-N1 to 201-NK) connected thereto, respectively. the RIRO output separation buffers 208-1 to 208-N have L output ports (209-11 to 209-1L) to (209-N1 to 209-NL) connected thereto, respectively.

A cell input to the input port 201-11 is accumulated in a vacant space of the RIRO input buffer 202-1 through the input multiplex buffer control section 203-1. The input multiplex buffer control section 203-1 has NXL control queues 204-11 to 204-NL for controlling cells accumulated in the RIRO input multiplex buffer 202-1 by each of the output ports 209-11 to 209-NL. When the cell is accumulated in the vacant space of the RIRO input multiplex buffer 202-1, an accumulation address of the cell is stored in a control queue corresponding to an output port indicated by the output port information contained in the cell. The input multiplex buffer control section 203-1 refers to the control queues 204-11 to 204-NL one after another so that each cell is read out based on the accumulation address prefixed to each of the control queues 204-11 to 204-NL. The rest of the input multiplex buffer control sections execute the same controlling.

Each cell multiplexed and read from the respective RIRO input multiplex buffers 202-1 to 202-N is stored in an FIFO output buffer corresponding to an output port indicated in the output port information contained by the cell via the time division bus 205.

Cells accumulated in the respective FIFO output buffers 206-1 to 206-N are read one by one and accumulated in a vacant space of the RIRO output separation buffers 208-1 to 208-N, respectively. The RIRO output separation buffers 208-1 to 208-N output the accumulated cell to an output port indicated by the output port information contained in the cell.

An output buffer control section 207-$i$ for controlling write/read of cells to/from a FIFO output buffer 206-$i$ ($1 \leq i < N$) outputs a back pressure signal 210 to all input multiplex buffer control sections 203-1 to 203-N when the vacant space of the KIRO buffer 206-$i$ becomes less than N cells so as to inhibit output of cells addressed to the output ports 209-$i$1 to 209-$i$L connected to the FIFO output buffer 206-$i$, respectively.

In each input multiplex buffer control section 203-1 to 203-N, cells other than those addressed to the output ports 209-$i$ to 209-$i$1 which have been accumulated in the RIRO input multiplex buffers 202-1 to 202-N are output sequentially.

The number of interface to the time division bus 205 can be decreased by connecting RIRO input multiplex buffers 202-1 to 202-N to FIFO output buffers 206-1 to 206-N, respectively via the time division bus 205 through multiplexing cells from a plurality of input ports.

With the conventional art shown in FIG. 8, when a large number of cells addressed to a certain output port are generated in the respective RIRO input buffers at a burst, the ratio of cells addressed to the certain output port which have been accumulated in the RIRO output separation buffer connected to the certain output port is increased. As a result, even though cells addressed to the other output port are accumulated in the RIRO input multiplex buffer, those cells cannot be output from the output port easily.

Furthermore in the conventional art shown in FIG. 8, each input multiplex buffer control section refers to each control queue by every output port sequentially so that each cell is read out based on the accumulation address prefixed to each of the control queues. So the same traffic amount is transferred from each of the RIRO input multiplex buffer to the certain output port.

Accordingly in case each of the RIRO input multiplex buffer has a different number of connections (active connection) for transferring cells existing between each RIRO input multiplex buffer and the certain output port, the same number of cells are transferred from the respective RIRO input multiplex buffer to the certain output port for a unit of time. In this conventional art shown in FIG. 8, each active connection addressed to the same output port uses different bandwidth, resulting in the failure to provide every user with equal service.

SUMMARY OF THE INVENTION

It is an object of the present invention to solve the aforementioned problems.

It is another object of the present invention to provide an ATM switch method and an ATM switch, in case a large number of cells addressed to a certain output port are generated at a burst, which can output cells addressed to the other output port and set so that the same bandwidth is used by the respective active connections.

The above object of the present invention is realized by the ATM switch method for an ATM switch using a plurality of input multiplex buffers connected to a plurality of input ports, a plurality of output separation buffers connected to a plurality of output ports and a plurality of output buffers each provided for the respective output separation buffers and are allowed to input cells equal to a number of the input multiplex buffers. When outputting a cell from the input multiplex buffer to the output buffer, the output of cells addressed to a certain output port from the input multiplex buffer is inhibited and other cells are sequentially output from an input multiplex buffer to be accumulated in an output buffer corresponding to an output port to which the cell is addressed in the case where a number of cells addressed to the certain output port which is equal to or more than a predetermined threshold value have been accumulated in an output separation buffer. Cells accumulated in the output buffer are output to be accumulated in a corresponding output separation buffer. Cells accumulated in an output separation buffer are then output to an output port to which the cell is addressed.

In the present invention, even though a large number of cells addressed to a certain output port are generated at a burst, cells addressed to the other output port can be output.

The present invention further allows the bandwidth used by a plurality of active connections addressed to the same output port to be set to the same value detecting a number of active connections existing between each output port and each input multiplex buffer. The a number of cells output from each output separation buffer is controlled to be proportional to a number of the active connections existing between an output port to which the cell is addressed and an input multiplex buffer that has output the cell based on a number of the detected active connections.

The above described control can be executed in the following two methods.

In the first method, the detected number of each active connection is set to a corresponding counter at each input multiplex buffer provided for the respective output ports. When outputting cells accumulated in the output separation buffer to the output port, the cells sent from the input multiplex buffer corresponding to the counter for the output port having the count value not set to 0 are sequentially output. The value of the counter corresponding to the input multiplex buffer that has transmitted cells is decremented at every output of the cell. Accordingly, in case the number of cells output from the output separation buffer is smaller than the number of cells input to the output separation buffer, owing to the limited number of the output port, the bandwidth used by the active connections can be set to the same value.

In the second method, when the number of cells output from the output separation buffer is equal to or more than that input to the output separation buffer, any input multiplex buffer outputting cells equal to or more than the number of cells proportional to the number of active connections is detected based on the count value of each counter for the respective input multiplex buffers provided for the output port each connected to the output separation buffer. The output of cells accumulated in the detected input multiplex buffer and addressed to the output port is inhibited. Accordingly, in case the number of cells output from the output separation buffer is equal to or more than the number of cells input thereto, the bandwidth used by the active connections can be set to the same value.

The above ATM switch method is realized by an ATM switch comprising a plurality of input multiplex buffers connected to a plurality of input ports, respectively; a plurality of output separation buffers connected to a plurality of output ports, respectively; input multiplex buffer control means for controlling the input multiplex buffer to inhibit output of a cell addressed to a certain output port indicated by the first back pressure signal; output separation buffer control means for monitoring an accumulation amount of cells in the output separation buffer at every output port to which the cell is addressed and outputting the first back pressure signal inhibiting output of a cell addressed to the output port to the input multiplex buffer control means in case of any output port having the accumulation amount equal to or more than a predetermined threshold value.

The bandwidth used by a plurality of active connections addressed to the same output port can be set to the same value when the ATM switch further comprises detection means for detecting a number of active connections existing between each output port and each input multiplex buffer. The output separation buffer control means further comprises output control means for controlling a number of cells addressed to the output port output from an output separation buffer to be proportional to a number of active connections existing between the output port and the input multiplex buffers based on a number of active connections detected by the detection means.

BRIEF DESCRIPTION OF THE PRESENT INVENTION

This and other objects, features and adbantages of the present invention will become more apparent upon a reading of the following detailed description and drawings, in which.

EMBODIMENTS

Embodiments of the present invention are described in detail, referring to the drawings.

Figure 1:
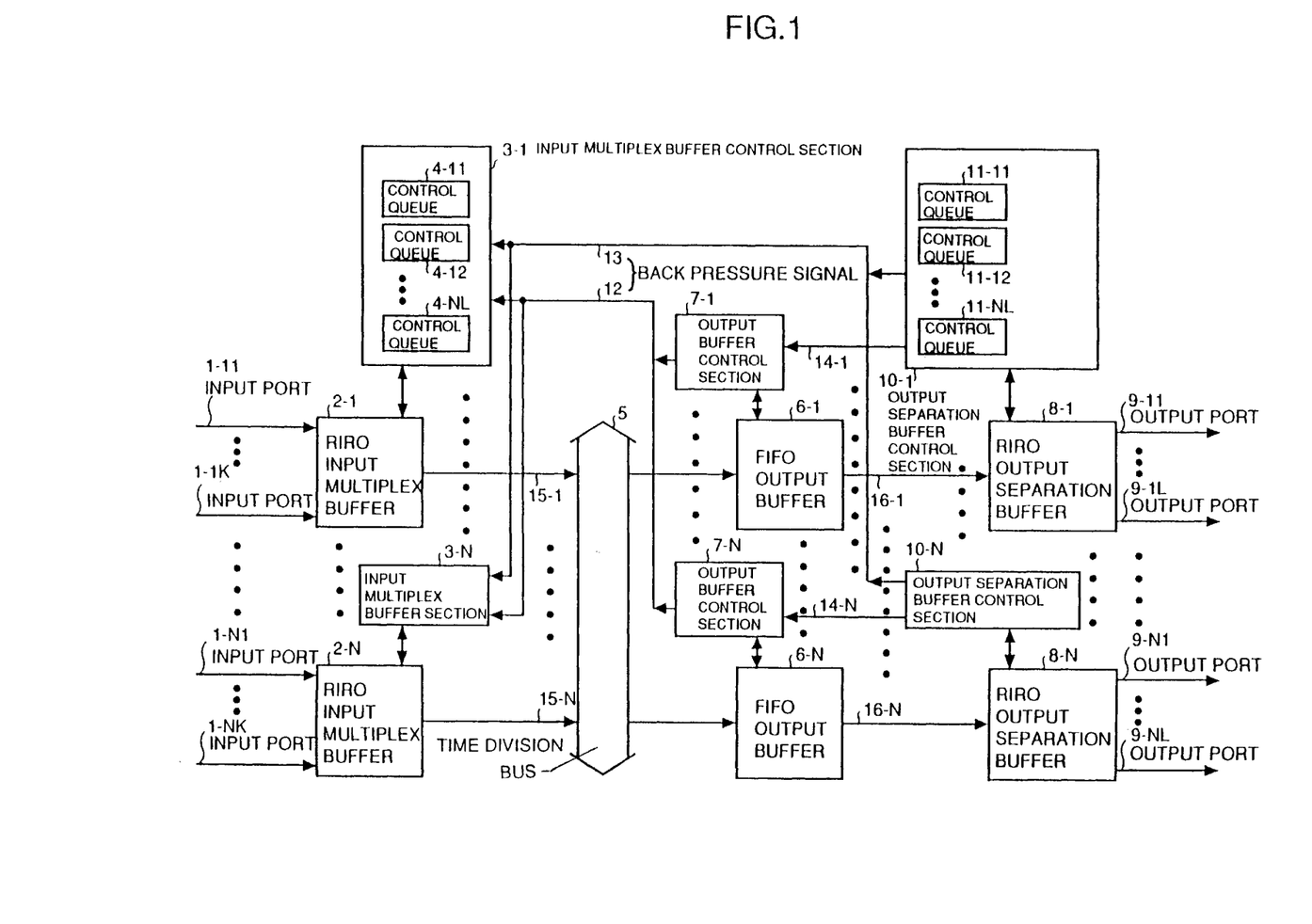
FIG. 1 is a block diagram of a first embodiment of the present invention.

FIG. 1 is a block diagram of a first embodiment of the present invention.

A switch of this embodiment comprises NxK input ports 1-11 to 1-NK, N units of low speed/large capacity RIRO input multiplex buffers 2-1 to 2-N, input multiplex control sections 3-1 to 3-N for controlling write/read of cells to/from the RIRO input multiplex buffers 2-1 to 2-N, a time division bus 5, N units of high speed/small capacity FIFO output buffers 6-1 to 6-N, output buffer control sections 7-1 to 7-N for controlling write/read of cells to/from the FIFO output buffers 6-1 to 6-N, N units of low speed/large capacity RIRO output separation buffers 8-1 to 8-N, NxL output ports 9-11 to 9-NL, output separation buffer control sections 10-1 to 10-N for controlling write/read of cells to/from the RIRO output separation buffers 8-1 to 8-N, input multiplex ports 15-1 to 15-N and output multiplex ports 16-1 to 16-N.

Each of the RIRO input multiplex buffers 2-1 to 2-N is connected to K input ports (1-11 to 1-1K) to (1-N1 to 1-NK).

Each of the RIRO output separation buffers 8-1 to 8-N is connected to L output ports (9-11 to 9-1L) to (9-N1 to 9-NL).

The input multiplex buffer control section 3-1 comprises NxL control queues 4-11 to 4-NL for controlling each accumulation address of cells accumulated in the RIRO input multiplex buffer 2-1 for the respective output ports 9-11 to 9-NL to which the cell is addressed. The input multiplex buffer control section 3-1 has a function for accumulating cells input from the input ports 1-11 to 1-1K to a vacant space of the RIRO input multiplex buffer 2-1 and a function for outputting each cell read based on the accumulation address prefixed to the respective control queues 4-11 to 4-NL sequentially to the input multiplex port 15-1 by referring to the control queues 4-11 to 4-NL one by one. The rest of the input multiplex buffer control sections have the same construction and functions as described above.

The output separation buffer control section 10-1 comprises NxL control queues 11-11 to 11-NL, each controlling accumulation addresses of cells accumulated in the RIRO output separation buffer 8-1 by each of the RIRO input multiplex buffers 2-1 to 2-N which has output those cells and by each of the output ports 9-11 to 9-1L to which those cells are addressed. The output separation buffer 10-1 has a function for accumulating cells transmitted from the FIFO output buffer 6-1 via the output multiplex port 16-1 in a vacant space of the RIRO output separation buffer 8-1, a function for registering the accumulation address of the cell to the control queue corresponding to the destination to which the cell is output and transferred, a function for reading out cells one by one, to the output port based on the accumulation address prefixed to each of the control queues 11-11 to 11-NL by referring to those control queues 11-11 to 11-NL sequentially, a function for inhibiting the output of cells sent from the FIFO output buffer 6-1 by outputting a back pressure signal 14-1 to the output buffer control section 7-1 when the vacant space of the RIRO output separation buffer 8-1 is fully occupied and a function for outputting a back pressure signal 13 instructing to inhibit output of cells addressed to the output port 9-1j to the input multiplex buffer control section 3-i when the number of the accumulation address registered in the control queue 11-ij ($1 \leq i \leq N$, $1 \leq j \leq L$) is equal to or more than a predetermined threshold value. The rest of the output separation buffer control sections have the same constructions and functions as described above.

The output buffer control section 7-1 has a function for storing cells addressed to the output ports 9-11 to 9-1L which have been transmitted via the time division bus 5 in the RIRO output buffer 6-1, a function for outputting a back pressure signal 12 instructing to inhibit the output of cells addressed to the output ports 9-11 to 9-1L to all input multiplex buffer control sections 3-1 to 3-N when the vacant space of the FIFO output buffer 6-1 is less than N cells and a function for reading out one cell after another stored in the FIFO output buffer 6-1 when a back pressure signal 14-1 has not been received from the output separation buffer control section 10-1. The rest of the output buffer control sections have the same functions as described above.

An operation of the first embodiment is described.

Cells input to the input ports 1-11 to 1-1K are accumulated in a vacant space of the RIRO input multiplex buffer 2-1 through the input multiplex buffer control section 3-1. When accumulating cells in the vacant space of the RIRO input multiplex buffer 2-1, the input multiplex buffer control section 3-1 registers accumulation address of each cell to the control queue 4-$xy$ ($1 \leq x \leq N$, $1 \leq y \leq L$) corresponding to the output port information contained in the cell.

Figure 2:
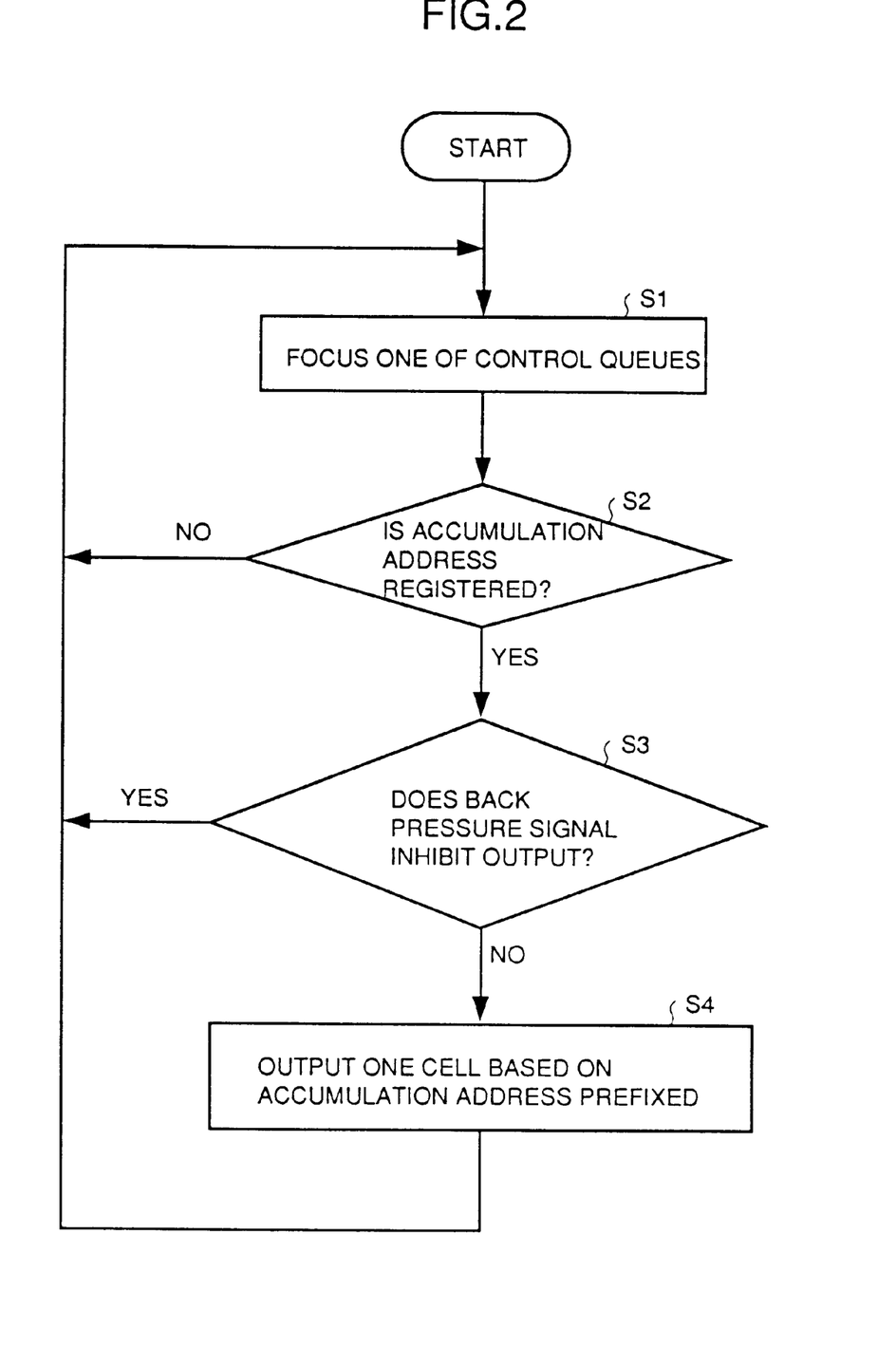
FIG. 2 is a flowchart representing the processing executed in the respective input multiplex buffer control sections 3-1 to 3-N.

The input multiplex buffer control section 3-1 executes the processing shown in a flowchart of FIG. 2 so that cells accumulated in the RIRO input multiplex buffer 2-1 are sequentially output to the input multiplex port 15-1. At S1, one of the control queues 4-11 to 4-NL is focused. At S2, it is judged whether or not the accumulation address has been registered in the focused control queue 4-$xy$. If it is determined that the accumulation address has not been registered to the focused control queue 4-$xy$, the next control queue is focused (S1). If it is determined that the accumulation address has been registered to the focused control queue, it is then judged whether or not back pressure signals 12 and 13 have been received in order to inhibit output of cells controlled by the control queue 4-$xy$ presently focused (S3). If it is determined that the output of cell is inhibited, the next control queue is focused (S1). If it is determined that the output of a cell has not been inhibited, one cell is read from the RIRO input multiplex buffer 2-1 based on the accumulation address prefixed to the control queue 4-$xy$ and output to the input multiplex port 15-1 (S4). Then the next control queue is focused (S1). The rest of the input buffers execute the same processing as described above. The cells are output from the respective RIRO input multiplex buffers 2-1 to 2-N to the input multiplex ports 15-1 to 15-N.

The cells output from the RIRO input multiplex buffers 2-1 to 2-N to the input multiplex ports 15-1 to 15-N, respectively are accumulated in the FIFO output buffer 6-1 to 6-N corresponding to the output port indicated by the output port information contained by the cell via the time division bus 5.

The cells, one by one, accumulated in the respective FIFO output buffers 6-1 to 6-N are output to the output multiplex ports 16-1 to 16-N sequentially.

Receiving cells via the output multiplex port 16-1, the output separation buffer control section 10-1 accumulates those received cells in a vacant space of the RIRO output separation buffer 8-1. Accumulating those cells in the vacant space of the RIRO output separation buffer 8-1, the output separation buffer control section 10-1 registers the accumulation address of the cell to the control queue 11-$ij$ among the control queue 11-11 to 11-NL corresponding to both the output port 9-1$j$ indicated by the output port information contained by the cell and the RIRO input multiplex buffer 2-1 that has transferred the cell. For example assuming that destinations for output and transfer are the output port 9-11 and the RIRO input multiplex buffer 2-1, respectively, the accumulation address is registered to the control queue 11-11. Assuming that destinations for output and transfer are the output port 9-1L and the RIRO input multiplex buffer 2-N, respectively, the accumulation address is registered to the control queue 11-NL.

The output separation buffer control section 10-1 refers to the control queues 11-11 to 11-NL sequentially and outputs cells, one by one, accumulated at each accumulation address prefixed to the respective control queues 11-11 to 11-NL to the output port indicated by the output port information contained in the cell.

Figure 3:
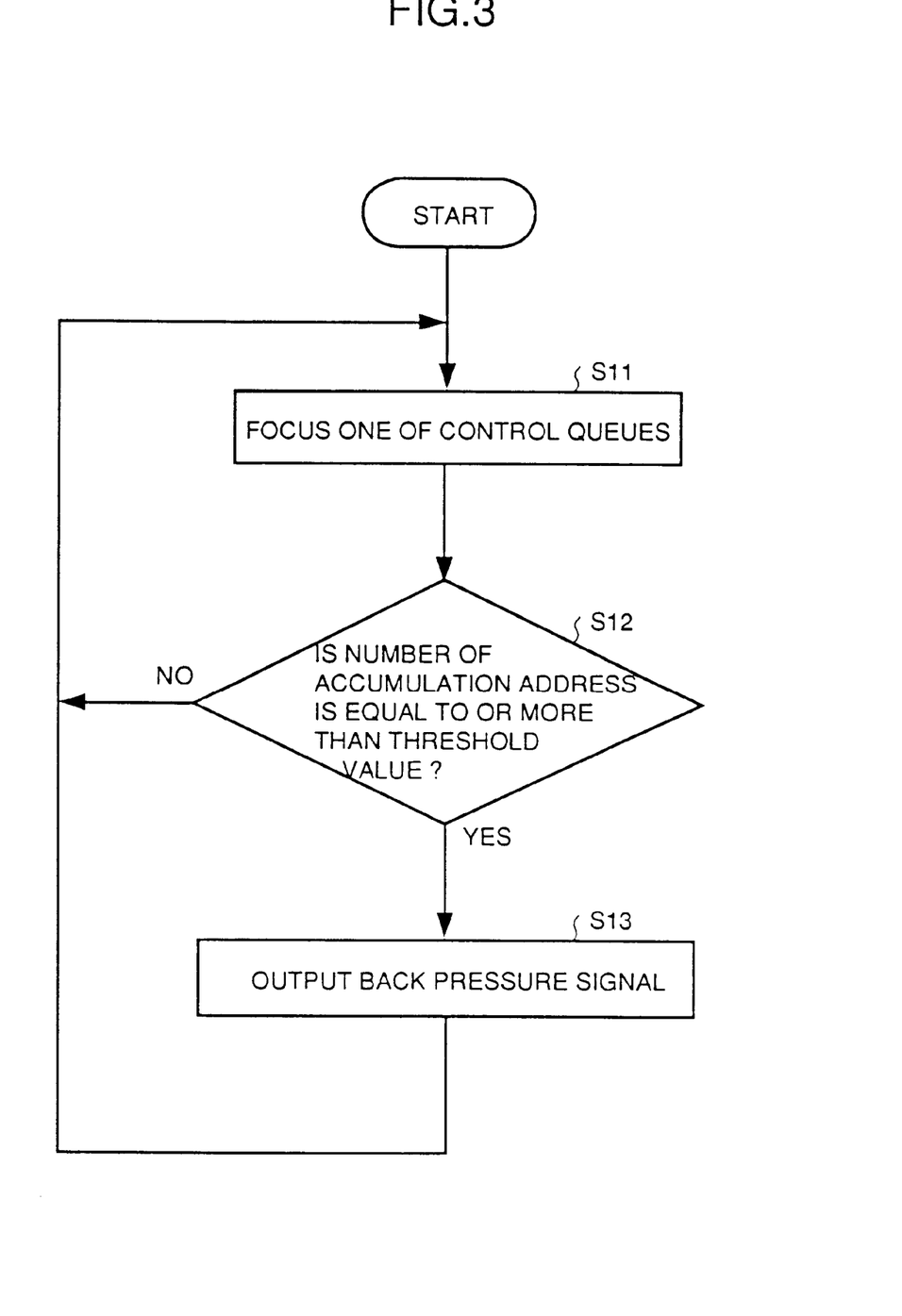
FIG. 3 is a flowchart representing each processing executed in the respective output separation buffer control sections 10-1 to 10-N.

The output separation buffer control section 10-1 further executes the processing of a flowchart shown in FIG. 3. At S11, one of the control queues 11-11 to 11-NL is focused. At S12, it is judged whether or not the number of accumulation addresses prefixed to the control queue 11-$ij$ presently focused is equal to or more than a predetermined threshold value. If it is determined that the number of the accumulation addresses is not equal to or more than the threshold value (If NO at S12), the next control queue is focused (S11). If it is determined that the number of the accumulation addresses is equal to ore more than the threshold value (If YES at S12), a back pressure signal 13 is output to the input multiplex buffer control section 3-1 for instructing to inhibit output of cells addressed to the output port 9-1$j$ among those accumulated in the RIRO input multiplex buffer 2-$i$ corresponding to the control queue 11-$ij$ (S13). Then the next control queue is focused (S11). For example, when the number of accumulation address registered to the control queue 11-11 is equal to or more than the threshold value, the output separation buffer control section 10-1 outputs the back pressure signal 13 to the input multiplex buffer control section 3-1 for inhibiting the output of cells addressed to the output port 9-11. The rest of other output separation buffer control sections execute the same processing as described above.

In case of the control queue $ij$ where the number of registered accumulation address is equal to or more than the threshold value, that is, the threshold or more number of cells addressed to a certain output port are accumulated in the RIRO output separation buffer, a back pressure signal 13 instructing to inhibit output of cells addressed to the output port 9-1$j$ corresponding to the control queue 11-$ij$ is output to the input multiplex buffer control section 3-$i$ corresponding to the above control queue 11-$ij$. Therefore even when a large number of cells addressed to a certain output port at a burst in the respective RIRO input multiplex buffers, those buffers addressed to the certain output port can be kept from being output from the RIRO input multiplex buffer. Accordingly even when a large number of cells addressed to a certain port are generated at a burst in the respective RIRO input multiplex buffers, the embodiment 1 allows the cells addressed to the other ports to be output.

Figure 4:
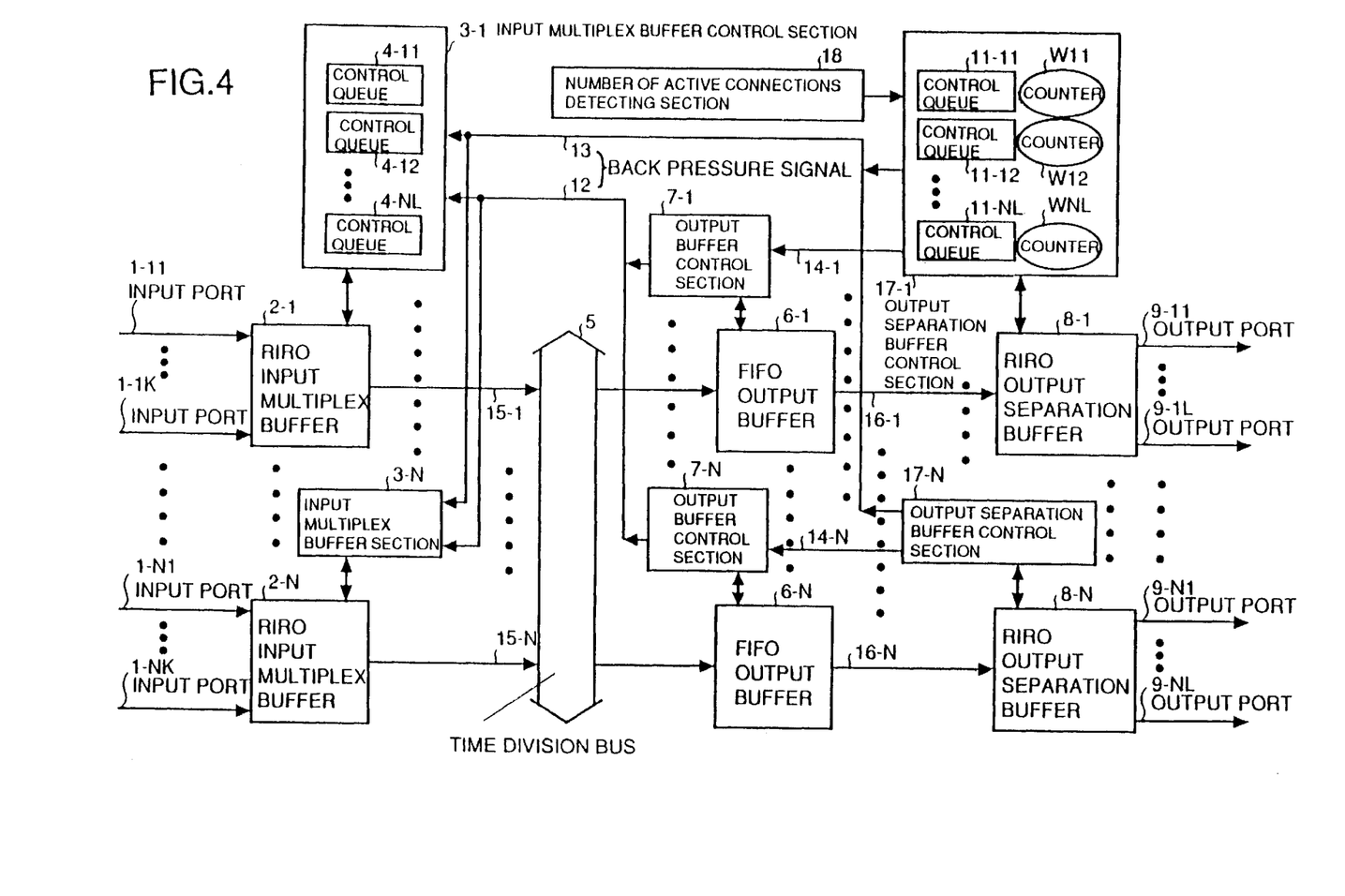
FIG. 4 is a block diagram of a second embodiment of the present invention.

FIG. 4 is a block diagram of a second embodiment of the present invention. The switch of this embodiment is the same as that shown in FIG. 1 except that output separation buffer control sections 10-1 to 10-N have been changed to 17-1 to 17-N and a section for detecting the number of active connections 18 has been added.

The output separation buffer control section 17-1 comprises NxL control queues 11-11 to 11-NL and NL units of counters W11 to WNL, each combined with the respective control queues 11-11 to 11-NL in pairs. The counter W$ij$ is provided for the pair of the RIRO input multiplex buffer 2-$i$ and the output port 9-1$j$ having the number of active connections existing between the RIRO input multiplex buffer 2-$i$ and the output port 9-1$j$.

The section for detecting the number of active connections 18 has a function for detecting the number of active connections existing between the output ports 9-11 to 9-NL and the respective RIRO input multiplex buffers 2-1 to 2-N.

The operation of the second embodiment is described.

The cells input to the respective input ports 1-11 to 1-NK are transferred to the RIRO multiplex separation buffers 8-1 to 8-N connected to the output port as the destination of the cell via the RIRO input multiplex buffers 2-1 to 2-N, the time division bus 5 and FIFO output buffers 6-1 to 6-N.

When the cell is transmitted to the RIRO output separation buffer 8-1, the output separation buffer control section 17-1 accumulates the cell in a vacant space of the RIRO output separation buffer 8-1 and registers the accumulation address of the cell to the control queue 11-$ij$ among control queues 11-11 to 11-NL corresponding to both the output port 9-1$j$ indicated by the output port information contained by the cell and the input multiplex buffer 2-*i* from which the cell is transferred. The output separation buffer control section 17-1 also executes processing of flowcharts shown in FIGS. 3 and 5 accompanied with the above processing.

Figure 5:
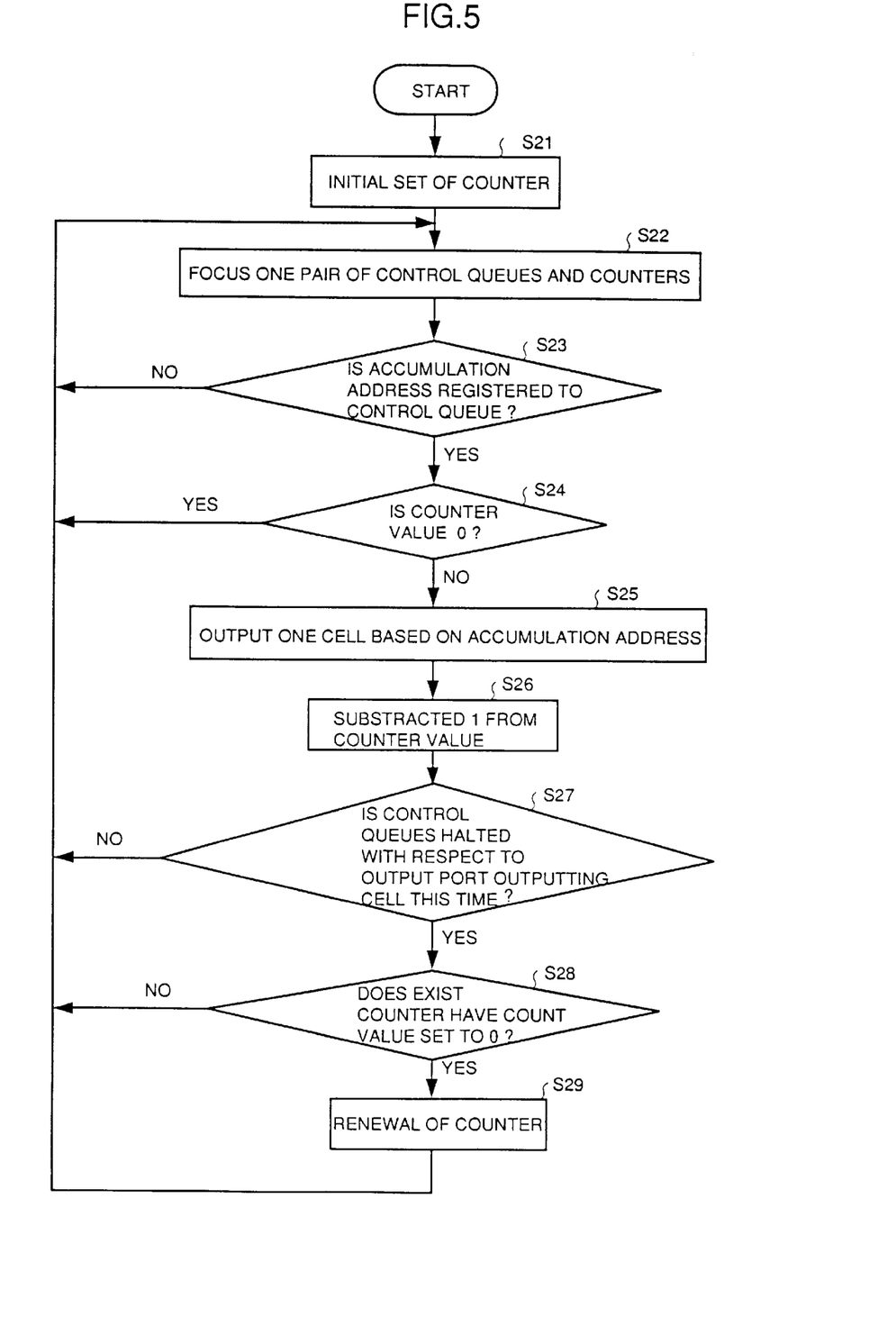
FIG. 5 is a flowchart representing the processing executed in the respective output separation buffer control sections 17-1 to 17-N.

Since the processing shown in FIG. 3 has been already described, the processing of the flowchart shown in FIG. 5 is described.

At S21, the output separation buffer control section 17-1 sets the number of active connections existing between the RIRO input multiplex buffers 2-1 to 2-N and the respective output ports 9-11 to 9-1L which has been detected by the section for detecting the number of active connections 18 in the respective counters W11 to WNL.

At S22, one pair of the control queues 11-11 to 11-NL and the counters W11 to WNL is focused (S22). When the accumulation address is not registered to the focused control queue 11-*ij* or if the value of the focused counter Wij is 0 (S23, S24), the next pair of the control queue and the counter is focused (S22). When the accumulation address is registered to the focused control queue 11-*ij* and the value of the focused counter Wij is not 0 (S23, S24), one cell is output to the output port 9-1*j* in accordance with the accumulation address prefixed to the control queue 11-*ij* (S25). Then 1 is subtracted from the value of the counter Wij (S26).

The output separation buffer control section 17-1 judges whether or not all the control queues 11-1*j*, 11-2*j* to 11-N*j* with respect to the output port 9-1*j* outputting the cell are halted (S27). When it is determined that the control queue 11-*ij* is halted, this means that no accumulation address is registered to the control queue 11-*ij* or the value of the counter Wij paired with the control queue 11-*ij* is set to 0.

When it is determined that all the control queues 11-1*j*, 11-2*j* to 11-N*j* with respect to the output port 9-*ij* outputting the cell at S27 are halted, it is judged whether or not one or more counters W1*j*, W2*j* to WN*j* paired with the respective control queues 11-1*j*, 11-2*j*, . . . 11-N*j* have the count value set to 0 (S28).

If it is determined that one or more counters have the count value set to 0, the number of active connections detected by the section for detecting the number of active connections 18 is newly set in the counters W1*j*, W2*j* to WNj with respect to the output port 9-1*j* outputting the cell or the value obtained by summing each value presently set in the counters W1*j*, W2*j* to WNj and the corresponding number of active connections detected by the section for detecting the active connections 18 is set in the counters W1*j*, W2*j* to WNj (S29).

The output separation buffer control section 17-1 focuses the next pair of the control queue and the counter (S22). When each determination at S27 and S28 is NO, the output separation buffer control section 17-1 focuses the next pair of the control queue and the counter (S22).

The above processing allows the number of cells transferred from the respective RIRO input multiplex buffers 2-1 to 2-N, which have been output from the output port 9-1*j* to be proportional to the number of active connections existing between the output port 9-1*j* and the respective RIRO input multiplex buffers 2-1 to 2-N. Additionally when the back pressure signal has not been transmitted to the input multiplex buffer control section 3-1, the same number of cells are transmitted from the respective RIRO input multiplex buffers 2-1 to 2-N to the output port 9-1*j*. When the number of cells output from the RIRO output separation buffer 8-1 is smaller than the number of cells input thereto, the cells from the RIRO input multiplex buffer 2-*i* having a small number of active connections existing between the RIRO input buffer 2*i* and the output port 9-1*j* are accumulated in the RIRO output separation buffer 8-1. The resultant number of cells exceeds a predetermined threshold value. As a result, a back pressure signal 13 is transmitted to the input multiplex buffer control section 3-*i* corresponding to the RIRO input multiplex buffer 2-*i*. As the number of cells transmitted from the RIRO input multiplex buffer 2-*i* to the output port 9-1*j* is decreased, the number of cells having the respective active connections transferred becomes the same. That is the respective active connections existing between the output port 9-1*j* and the respective RIRO input multiplex buffers 2-1 to 2-N are set to use the same bandwidth.

Next a third embodiment of the present invention is described. The third embodiment is realized by executing the processing of the flowchart shown in FIG. 6 between S28 and S29 shown in FIG. 5.

Figure 6:
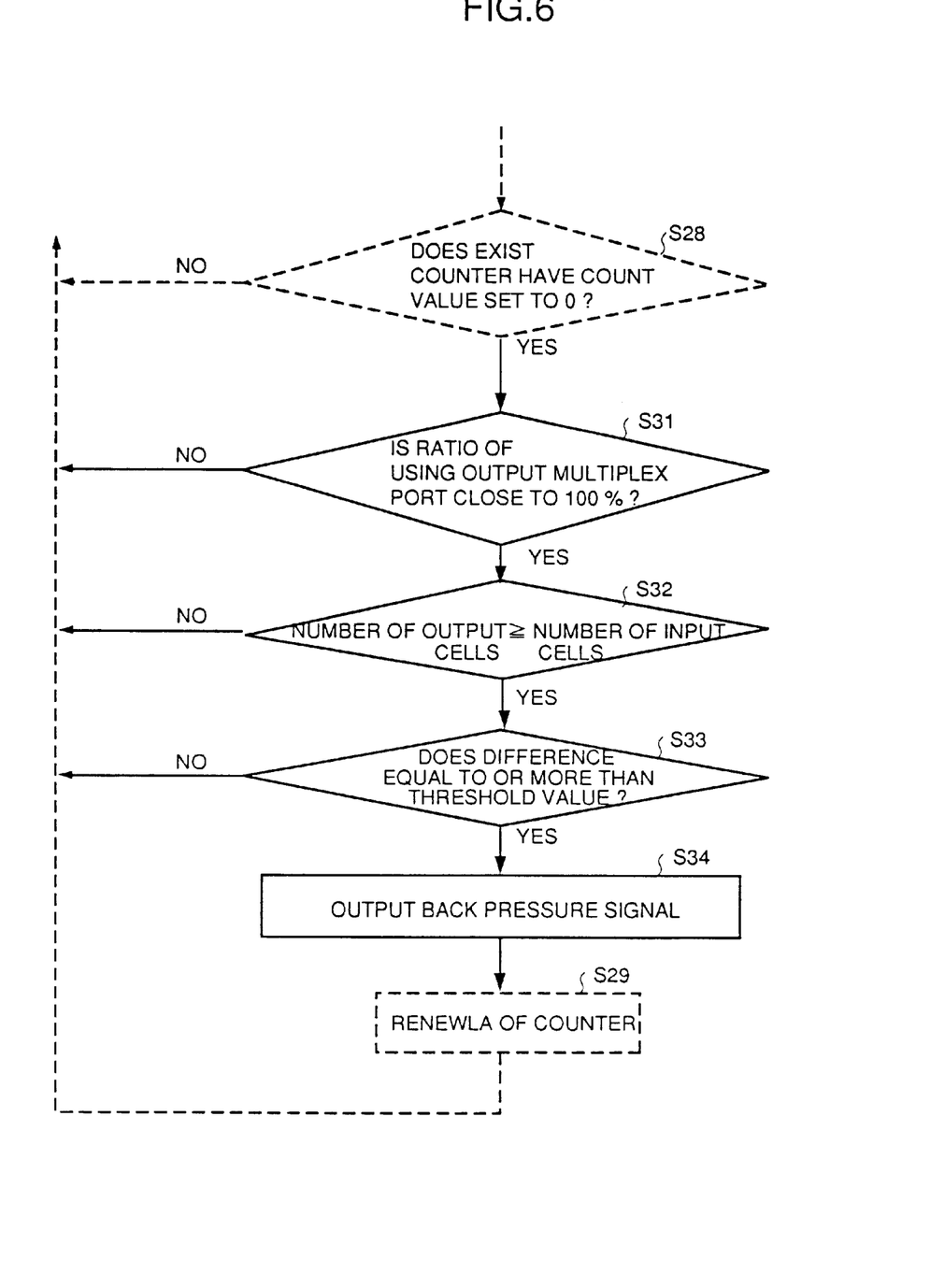
FIG. 6 is a flowchart representing a processing executed in a third embodiment of the present invention.

The output buffer control section 17-1 judges whether or not the ratio of using the output multiplex port 16-1 is close to 100% at S31. When it is determined the ratio is close to 100% (If YES at S31), it is judged whether or not the number of cells output from the RIRO output separation buffer 8-1 is equal to or more than the number of cells input thereto (S32). When the difference between the maximum value and minimum value both set in each of the counters W1*j*, W2*j* to WNj is equal to or more than the threshold value, it can be assumed that cells more than the number of cells proportional to the number of active connections existing between the output port 9-1*j* and the respective RIRO input multiplex buffers 2-1 to 2-N have been output. When the difference is equal to or more than the threshold value, a back pressure signal 13 is output to the input multiplex buffer control section 3-*i* corresponding to the counter Wij where the initial value has been set, instructing to inhibit the output of the cell addressed to the output port 9-1*j* (S34). Accordingly, the RIRO input buffer 2-*i* outputting cells more than the number of cells proportional to the number of active connections existing between the output port 9-1*j* and the respective RIRO input multiplex buffers 2-1 to 2-N is prevented from outputting cells to the output port 9-1*j*. When the determination at each S31, S32 and S33 is NO, the next pair of the control queue and the counter is focused (See S22 of FIG. 5).

Then each value of the counters W1*j*, W2*j* to WNj is updated at S29. In this embodiment, the value currently set in the counters W1*j*, W2*j* to WNj is added to the corresponding number of active connections detected by the section for detecting the number of active connections 18. The resultant value is set in the counter W1*j*, W2*j* to WNj for updating each counter value thereof. In this Embodiment, when the difference between the maximum value and the minimum value each set in the counter W1*j*, W2*j* to WNj is equal to or more than the threshold value, the back pressure signal 13 is output to the input multiplex buffer control section 3-*i* corresponding to the counter Wij where the minimum value has been set, instructing to inhibit output of a cell addressed to the output port 9-1*j*. It can be so constructed to obtain all the counters having the difference value equal to or more than the threshold value. Then the back pressure signal 13 is output to each of the input multiplex buffer control sections corresponding to the obtained counters.

Accordingly, even when cells output from the RIRO output separation buffer 8-1 are more than the number of cells input thereto, it can be so set to allow the respective active connections to use the same bandwidth.

The present invention inhibits the output of cells accumulated in the output separation buffer among those accumulated in the input multiplex buffer that are addressed to the output port where the the number of cells from the input multiplex buffer is equal to or more than a predetermined threshold value. Even when a large number of cells addressed to a certain output port are generated at a burst, cells addressed to the other output port can be output.

In the present invention, when the cell accumulated in the output separation buffer is output to the output port, the number of cells from the respective input multiplex buffer output from the output port is controlled to be proportional to the number of active connections existing between the output port and the respective input multiplex buffers. The same bandwidth of the output port can be used by the respective active connections, thus providing every user with equal service.

In the present invention, the number of active connections between each output port and the respective input multiplex buffers is set in the counter. When the cell accumulated in the output separation buffer is output to the output port, cells transmitted from the input multiplex buffer corresponding to the counter having the count value not set to 0 among those corresponding to the output port are output sequentially. The value of the counter corresponding to the input multiplex buffer as the transmission source of the output cell is decremented at every output of the cell. As a result, the same bandwidth can be used by the respective active connections irrespective of the number of the output ports.

When the number of cells output from the output separation buffer is equal to or more than the number of cells input thereto, the present invention detects the input multiplex buffer outputting cells equal to or more than the number of cells proportional to the number of active connections through the output port based on the count value of each counter for the output port connected to the output separation buffer. As the output of cells addressed to the output port among those accumulated in the detected input multiplex buffer is inhibited, the same bandwidth can be used by the respective active connections even when the number of cells output from the output separation buffer is equal to or more than the number of cells input thereto.

What is claimed is:

1. An Asynchronous Transfer Mode (hereinafter referred to as "ATM" switch method for an ATM switch having a plurality of input multiplex buffers connected to a plurality of input ports, a plurality of output separation buffers connected to a plurality of output ports and a plurality of output buffers each provided for said respective output separation buffers, said output buffers having a capacity for accumulating cells equal to a number of said input multiplex buffers, said ATM switch method comprising the steps of:

accumulating a cell input, from an input port, in an input multiplex buffer connected to said input port;

inhibiting output of a cell addressed to a certain output port from an input multiplex buffer when said cell of said certain output port, equal to or more than a threshold value, has been accumulated in said input multiplex buffer;

outputting a cell, except for said inhibited output cell, from said input multiplex buffer and accumulating said output cell in an output buffer corresponding to an output port of said output cell;

outputting a cell accumulated in said output buffer and accumulating said output cell in an output separation buffer corresponding to an output port of said output cell;

outputting a cell accumulated in said output separation buffer to be output to an output port to which said cell is addressed;

detecting a number of active connections existing between each output port and each input multiplex buffer;

setting a detected number of active connections in counters provided for each output port; and controlling a number of cells output from each output separation buffer so that said number of cells are in proportional to a number of said active connections existing between an output port to which said cell is addressed and an input multiplex buffer that has output said cell based on a number of said detected active connections, wherein said controlling step further includes:

outputting a cell addressed to an output port corresponding to a counter with said count value not set to 0 among said counters when outputting cells accumulated in an output separation buffer to said output port and subtracting a value of said counter corresponding to an output port that has output cells at every output of a cell.

2. An Asynchronous Transfer Mode (hereinafter referred to as ("ATM") switch method for an ATM switch having a plurality of input multiplex buffers connected to a plurality of input ports, a plurality of output separation buffers connected to a plurality of output ports and a plurality of output buffers each provided for said respective output separation buffers, said output buffers having a capacity for accumulating cells equal to a number of said input multiplex buffers, said ATM switch method comprising the steps of:

accumulating a cell input, from an input port, in an input multiplex buffer connected to said input port;

inhibiting output of a cell addressed to a certain output port from an input multiplex buffer when said cell of said certain output port, equal to or more than a threshold value, has been accumulated in said input multiplex buffer;

outputting a cell, except for said inhibited output cell, from said input multiplex buffer and accumulating said output cell in an output buffer corresponding to an output port of said output cell;

outputting a cell accumulated in said output buffer and accumulating said output cell in an output separation buffer corresponding to an output port of said output cell;

outputting a cell accumulated in said output separation buffer to be output to an output port to which said cell is addressed;

detecting a number of active connections existing between each output port and each input multiplex buffer;

controlling a number of cells output from each output separation buffer so that said number of cells are in proportional to a number of said active connections existing between an output port to which said cell is addressed and an input multiplex buffer that has output said cell based on a number of said detected active connections;

detecting an output port to which cells, equal to or more than a number of cells proportional to a number of active connections, are addressed based on a count value of a counter provided for said output port with respect to each output port connected to an output separation buffer when a number of cells output separation buffer is equal to or more than a number of cells input to said output separation buffer; and inhibiting output of a cell addressed to said output port from an input multiplex buffer.

3. An Asynchronous Transfer Mode (hereinafter referred to as "ATM") switch method for an ATM switch having a plurality of input multiplex buffers connected to a plurality of input ports, a plurality of output separation buffers connected to a plurality of output ports and a plurality of output buffers each provided for said respective output separation buffers, said output buffers having a capacity for accumulating cells equal to a number of said input multiplex buffers, said ATM switch method comprising the steps of:

a step of accumulating a cell input, from an input port, in an input multiplex buffer connected to said input port;

a step of inhibiting output of a cell addressed to a certain output port from an input multiplex buffer when said cell of said certain output port, equal to or more than a threshold value, has been accumulated in said input multiplex buffer;

a step of outputting a cell, except for said inhibited output cell, from said input multiplex buffer and accumulating said output cell in an output buffer corresponding to an output port of said output cell;

a step of inhibiting output of cells when an output separation buffer corresponding to said cells is fully occupied and otherwise outputting cells to be accumulated in a corresponding output separation buffer;

a step of detecting a number of active connections existing between each output port and each input multiplex buffer; and a step of controlling a number of cells output from each output separation buffer so that said number of cells are proportional to a number of active connections existing between an output port to which said cell is addressed and an input multiplex buffer that has output said cell based on said detected number of active connections, wherein said step for controlling output of said cell further comprising the steps of:

setting a detected number of active connections in counters provided for each output port; and sequentially outputting a cell addressed to an output port corresponding to a counter with a count value not set to 0 among said counters and subtracting a value of a counter corresponding to an output port that has output a cell at every output of said cell when outputting cells accumulated in an output separation buffer to an output port.

4. An Asynchronous Transfer Mode (hereinafter referred to as "ATM") switch method for an ATM switch having a plurality of input multiplex buffers connected to a plurality of input ports, a plurality of output separation buffers connected to a plurality of output ports and a plurality of output buffers each provided for said respective output separation buffers, said output buffers having a capacity for accumulating cells equal to a number of said input multiplex buffers, said ATM switch method comprising the steps of:

a step of accumulating a cell input, from an input port, in an input multiplex buffer connected to said input port;

a step of inhibiting output of a cell addressed to a certain output port from an input multiplex buffer when said cell of said certain output port, equal to or more than a threshold value, has been accumulated in said input multiplex buffer;

a step of outputting a cell, except for said inhibited output cell, from said input multiplex buffer and accumulating said output cell in an output buffer corresponding to an output port of said output cell;

a step of inhibiting output of cells when an output separation buffer corresponding to said cells is fully occupied and otherwise outputting cells to be accumulated in a corresponding output separation buffer;

a step of detecting a number of active connections existing between each output port and each input multiplex buffer; and a step of controlling a number of cells output from each output separation buffer so that said number of cells are proportional to a number of active connections existing between an output port to which said cell is addressed and an input multiplex buffer that has output said cell based on said detected number of active connections, wherein said step for controlling output of said cell further comprising the steps of:

detecting an output port to which cells, equal to or more than a number of cells proportional to a number of active connections, are addressed based on a count value of a counter provided for said output port with respect to each output port connected to an output separation buffer when a number of cells output from said output separation buffer is equal to or more than a number of cells input to said output separation buffer; and inhibiting output of the cells addressed to said output from an input multiplex buffer.

5. An Asynchronous Transfer Mode (hereinafter referred to as "ATM") switch comprising:

a plurality of input multiplex buffers connected to a plurality of input ports, respectively;

a plurality of output separation buffers connected to a plurality of output ports, respectively;

input multiplex buffer control means for controlling said input multiplex buffer so that output of a cell addressed to a certain output port indicated by a first back pressure signal is inhibited; and output separation buffer control means for monitoring an accumulation amount of cells in said output separation buffer at every output port to which said cell is addressed and outputting said first back pressure signal to said input multiplex buffer control means to inhibit output of a cell addressed to an output port having said accumulation amount equal to or more than a predetermined threshold value;

detection means for detecting a number of active connections existing between each output port and each input multiplex buffer; and said output separation buffer control means further comprises output control means for controlling a number of cells addressed to said output port output from an output separation buffer so that said number of cells are in proportional to a number of active connections existing between said output port and said input multiplex buffers based on a number of active connections detected by said detection means, wherein said output control means further comprises:

a counter each provided for an output port;

means for setting each number of active connections detected by said detection by said detection means in said counter; and means for sequentially outputting a cell addressed to an output port corresponding to a counter having count value not set to 0 among said counters when outputting cells accumulated in an output separation buffer to an output port and subtracting a counter value corresponding to an output port which has output cells at every output of a cell.

6. The ATM switch of claim 5, wherein said output control means comprises:

means for detecting an output port to which cells equal to or more than a number of active connections have been output based on a count value of a counter corresponding to an output port connected to said output separation buffer when said cells output from said output separation buffer are equal to or larger than cells input thereto; and means for outputting said first back pressure signal inhibiting output of cells addressed to said detected output port to said input multiplex buffer control means.

7. An ATM switch comprising:

a plurality of input multiplex buffers connected to a plurality of input ports, respectively;

a plurality of output separation buffers connected to a plurality of output ports, respectively;

a plurality of output buffers provided for each of said output separation buffers for accumulating a cell output from said input multiplex buffer, each of said output buffers allowed to input a same number of cells as a number of said input multiplex buffers;

input multiplex buffer control means for controlling said input multiplex buffer to inhibit output of a cell addressed to an output port indicated by a first back pressure received thereby;

output buffer control means for controlling said output buffer to inhibit output of a cell addressed to an output separation buffer indicated by a second back pressure received thereby;

first output separation buffer control means for monitoring an accumulation amount of cells in each of said output separation buffers and outputting said first back pressure signal inhibiting output of cells, addressed to said output port, to said input multiplex buffer control means when said accumulation amount becomes equal to or more than a predetermined threshold value;

second output separation buffer control means for monitoring an accumulation amount of each of said output separation buffers and outputting said second back separation buffer when any output separation buffer has no vacant space for accumulating cells;

detection means for detecting a number of active connections existing between each output port and each input multiplex buffer; and third output separation buffer control means for controlling a number of cells addressed to said output port output from an output separation buffer to be proportional to the number of active connections existing between said output port and said input multiplex buffers based on a number of active connections detected by said detection means, wherein said third output separation buffer control means further comprises:

a counter provided for each output port;

means for setting each number of active connections detected by said detection means in said counter; and means for sequentially outputting a cell addressed to an output port corresponding to a counter having a count value not set to 0 among said counters when outputting cells accumulated in an output separation buffer to an output port and subtracting a value of said counter corresponding to an output port that has output a cell at every output of a cell.

8. An ATM switch comprising:

a plurality of input multiplex buffers connected to a plurality of input ports, respectively;

a plurality of output separation buffers connected to a plurality of output ports, respectively;

a plurality of output buffers provided for each of said output separation buffers for accumulating a cell output from said input multiplex buffer, each of said output buffers allowed to input a same number of cells as a number of said input multiplex buffers;

input multiplex buffer control means for controlling said input multiplex buffer to inhibit output of a cell addressed to an output port indicated by a first back pressure received thereby;

output buffer control means for controlling said output buffer to inhibit output of a cell addressed to an output separation buffer indicated by a second back pressure received thereby;

first output separation buffer control means for monitoring an accumulation amount of cells in each of said output separation buffers and outputting said first back pressure signal inhibiting output of cells, addressed to said output port, to said input multiplex buffer control means when said accumulation amount becomes equal to or more than a predetermined threshold value;

second output separation buffer control means for monitoring an accumulation amount of each of said output separation buffers and outputting said second back separation buffer when any output separation buffer has no vacant space for accumulating cells;

detection means for detecting a number of active connections existing between each output port and each input multiplex buffer; and third output separation buffer control means for controlling a number of cells addressed to said output port output from an output separation buffer to be proportional to the number of active connections existing between said output port and said input multiplex buffers based on a number of active connections detected by said detection means, wherein said third output separation buffer control means further comprises:

means for detecting an output port to which cells equal to or more than a number of active connections have been output based on a count value of a counter corresponding to an output port connected to an output separation buffer when cells output separation buffer when cells output from said output separation buffer is equal to or more than cells input thereto; and means for outputting said first back pressure signal inhibiting output of a cell addressed to said detected output port to said input multiplex buffer control means.

* * * * *